(No Model.)

J. BARKER.
RECIPROCATING SHAFT AND DRIVER THEREFOR.

No. 264,997. Patented Sept. 26, 1882.

WITNESSES:
James F. Tobin
David Williams

INVENTOR:
James Barker
by his Attorneys
Howson and Sons

United States Patent Office.

JAMES BARKER, OF PHILADELPHIA, PENNSYLVANIA.

RECIPROCATING SHAFT AND DRIVER THEREFOR.

SPECIFICATION forming part of Letters Patent No. 264,997, dated September 26, 1882.

Application filed August 28, 1882. (No model.)

*To all whom it may concern:*

Be it known that I, JAMES BARKER, a citizen of the United States, residing in Philadelphia, Pennsylvania, have invented certain Improvements in Reciprocating Shafts and Drivers therefor, of which the following is a specification.

My invention relates to an improvement in that class of mechanical appliances by which a shaft is rotated while it reciprocates; and the main object of my invention is to afford facilities for readily repairing the parts which are most rapidly worn.

Figure 1:
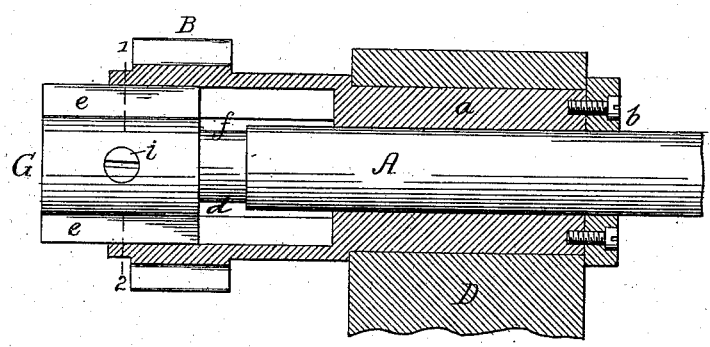
Figure 2:
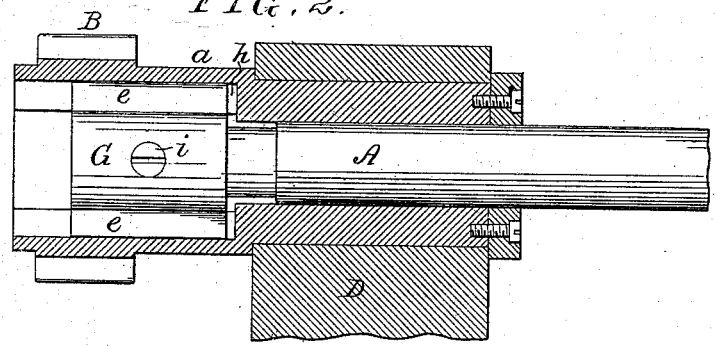
Figure 3:
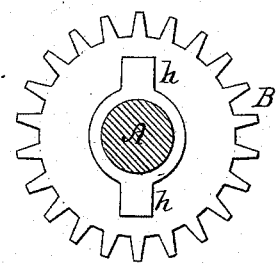

In the accompanying drawings, Figures 1 and 2 are sectional views illustrating my invention, and showing the reciprocating shaft in different positions; Fig. 3, a front view of the hub of the driving-wheel; and Fig. 4, a section on the line 1 2, Fig. 1.

In many machines shafts which both reciprocate and rotate are used, and the usual plan is to secure a feather on the shaft adapted to a groove in the eye of the driving-wheel through which the shaft passes, or sometimes the shaft is grooved and a key adapted to the groove secured in the eye of the wheel. In either of these cases, if the movement be rapid, the strain exerted on the feather to turn the shaft, combined with the constant friction due to the reciprocation of the said shaft, soon wears away not only the feather or key, but that part of the shaft itself which passes through the driving-wheel. Hence it often becomes necessary to discard the entire shaft—an evil which my invention is mainly intended to obviate.

Figure 4:
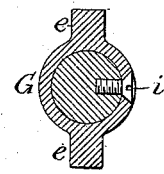

In the drawings, A is the reciprocated shaft, and B the cog-wheel through the medium of which the shaft is rotated. This wheel has an extended hub, $a$, forming a journal, of which D is the fixed bearing, and this journal is provided with a collar, $b$. A sleeve, G, having wings $e$—two in the present instance—is secured to the shaft A, which is preferably reduced at $d$, and a portion of the bore of the wheel is enlarged to form a chamber, $f$, for admitting the sleeve, the latter fitting snugly, but so as to slide freely, in the said chamber, from which extend grooves or slots $h$ for the admission of the wings $e$. The sleeve G is secured to the shaft by a set-screw, $i$, as shown in Fig. 4, the head of the screw being sunk into the sleeve, so that it shall not interfere with the free reciprocation of the latter in the chamber $f$ of the wheel. It is advisable that the length of the sleeve should be such in respect to the extent of its reciprocating movement that when it occupies the position shown in Fig. 1 the greater portion of the sleeve shall be contained within the chamber $f$ of the wheel, and when it occupies the position Fig. 2 the outer end of the sleeve should extend into the chamber, so that the entire sleeve will be subjected to friction and the formation of ridges on it prevented. When the sleeve and its wings become so far worn that repairs become necessary all that is required is to detach the sleeve from the shaft and apply a new sleeve to it. While in some cases a sleeve with a single wing might be used, two wings or more are preferred; and the sleeve may have so many wings that it will assume the form of a cog-wheel, the wheel B having grooves to correspond with the teeth or wings on the sleeve.

I claim as my invention—

The combination of a wheel, B, its journal $a$, chamber $f$, and groove or grooves $h$ with a reciprocated shaft, A, and a winged sleeve, G, detachably secured to the said shaft and adapted to the said chamber $f$, all substantially as set forth.

In testimony whereof I have signed my name to this specification in the presence of two subscribing witnesses.

JAMES BARKER.

Witnesses:
HARRY DRURY,
HENRY HOWSON, Jr.